Nov. 11, 1952        W. L. McGEHEE        2,617,530

SEPARATING ASSEMBLY FOR DEHYDRATING PLANTS

Filed Jan. 27, 1947        2 SHEETS—SHEET 1

INVENTOR.
Wallace L. McGehee
BY
ATTORNEY

Nov. 11, 1952     W. L. McGEHEE     2,617,530
SEPARATING ASSEMBLY FOR DEHYDRATING PLANTS
Filed Jan. 27, 1947     2 SHEETS—SHEET 2

INVENTOR.
Wallace L. McGehee
BY
ATTORNEY

Patented Nov. 11, 1952

2,617,530

UNITED STATES PATENT OFFICE 2,617,530

SEPARATING ASSEMBLY FOR DEHYDRATING PLANTS

Wallace L. McGehee, Kansas City, Mo., assignor to McGehee Company, Kansas City, Mo., a corporation of Missouri Application January 27, 1947, Serial No. 724,502

2 Claims. (Cl. 209—137)

This invention relates to the field of dehydration and more particularly to an assembly usable with conventional types of dehydrators for separating the particles of dehydrated material by removal of the relatively light and desirably dehydrated portions thereof progressively as the material moves from the dehydrator.

The primary aim of this invention is to provide a separating assembly for dehydrating plants, which assembly is disposed between the dehydrator drum and the point of storing, loading or sacking the treated material, and that is provided with an unique baffle construction and suction means for removing lighter particles of the material as the latter passes therethrough.

The most important object of this invention is to provide a material separator for dehydrating plants wherein an upright pipe through which the material passes is provided with a plurality of angularly disposed, adjustable baffles in spaced superimposed relation and an outlet conduit communicating with the pipe below each of said baffles respectively, which conduits withdraw the material from the pipe to separate the same according to the specific gravity of the particles thereof.

Other objects of this invention include the manner in which the aforesaid baffles are adjustably mounted in the material passage; the way in which the outlet conduits are disposed with respect to the several baffles; the manner of providing an air inlet in the pipe in opposed relation to the outlet conduits and adjacent the respective baffles; and the way in which specific details of construction render the assembly accurate, efficient and easy to operate.

Many minor objects will be made clear or become apparent during the course of the following specification, reference being had to the accompanying drawings, wherein.

It is common knowledge among those skilled in the art of dehydration that particles of material emanating from the drum of a dehydrator vary greatly with respect to the amount of moisture that has been removed from the individual particles. Such condition exists primarily because of the vast difference in the size of such particles and because the larger pieces contain more moisture than the relatively fine particles. Many times this condition prevails to the extent that recirculation through the drum of the dehydrator becomes necessary to re-dehydrate the larger particles. The problem of separating such larger particles from those that have been properly dehydrated is solved through employment of my separating assembly. This separating unit is flexible enough to permit removal of any type of material from the stream thereof passing from the dehydrator drum either for use or to again pass the same through the plant for further drying either directly or after grinding to desired size.

Figure 1:
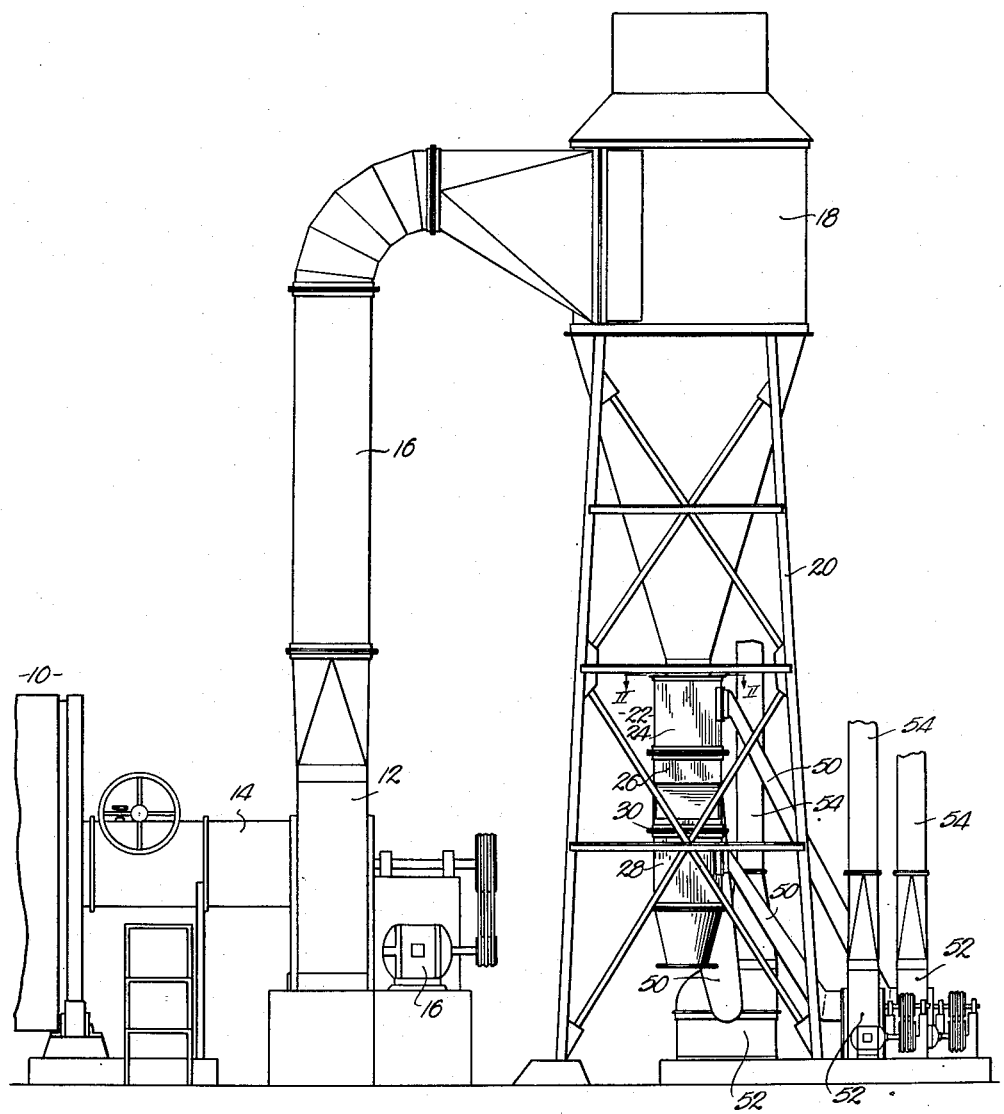
Fig. 1 is a fragmentary side elevational view of a dehydrating plant, having a separating assembly made in accordance with the present invention.
Figure 2:
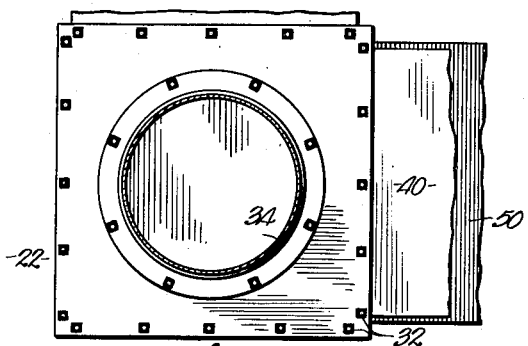
Fig. 2 is a fragmentary sectional view of the separating assembly per se, taken on line II—II of Fig. 1, looking in the direction of the arrows.
Figure 4:
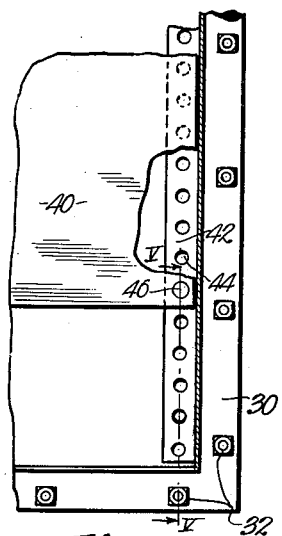
Fig. 4 is a fragmentary detailed sectional view taken on line IV—IV of Fig. 3, looking in the direction of the arrows.

A dehydrating plant with which the separating assembly may be employed is shown in fragmentarily in Fig. 1 and includes a drum designated by the numeral 10. The material to be dehydrated enters at one end of this rotatable drum (not shown) and dehydration takes place as this material is sucked therethrough by a blower 12. A longitudinally shiftable conduit 14 interconnecting the rotatable drum 10 and the suction blower 12 comprises a pair of telescoping sections, one of which is movable to and from selected positions extending into drum 10 to withdraw particles of desired specific gravity therefrom. This interconnecting assembly 14 is the subject matter of a co-pending application for Letters Patent and forms no part of this invention. The blower 12 is driven by an electric motor or the like 16, connected to a source of suitable electrical energy (not shown), and in addition to creating a suction within drum 10 and interconnecting conduit 14, forces the dehydrated material through a pipe 16 where this material is elevated into a hopper or cyclone separator 18. This hopper 18 and all of the parts forming the separating assembly about to be described is supported by framework 20 of any suitable construction.

Figure 5:
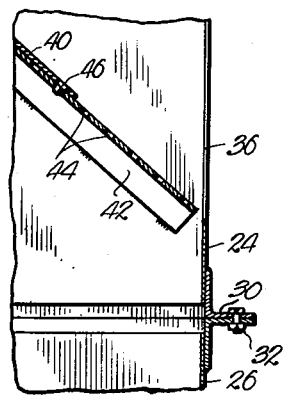
Fig. 5 is a fragmentary sectional view taken on line V—V of Fig. 4.

A vertical pipe broadly designated by the numeral 22 depends from and is in communication at its uppermost end with the hopper 18. This pipe 22 comprises a number of sections, three of which have been illustrated and designated by the numerals 24, 26 and 28 respectively. The sections are interconnected and in the illustrated embodiment have outwardly extending continuous flanges as at 30, illustrated specifically in Fig. 5, disposed in abutting relation and joined together by bolts or the like 32. The uppermost end of this pipe 22 has an inlet opening 34 in direct communication with the lowermost end of hopper 18. It is clear, therefore, that dehydrated material is free to flow by gravity from the hopper 18 into pipe 22 and if desired a gate (not shown) may be provided in this hopper 18 for regulating such flow of the material.

Figure 3:
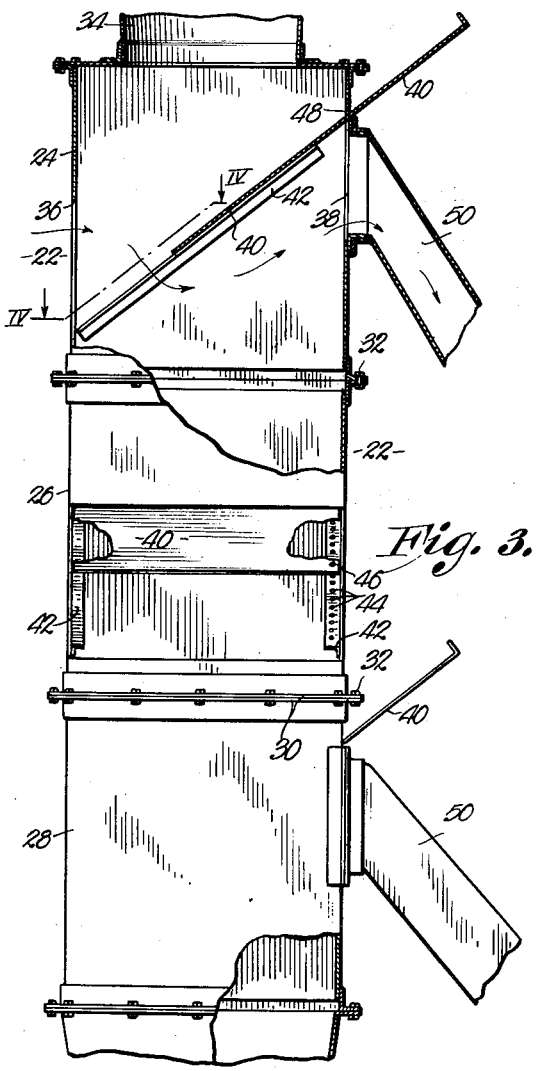
Fig. 3 is a fragmentary side elevational view of the separating unit, parts being broken away for clearance.

Each of the sections 24, 26 and 28 is structurally identical and, therefore, only one need be explained. An air inlet opening 36 is provided in one wall of each of such sections and an outlet opening 38 is formed in opposed relation to the inlet opening 36. A baffle 40 underlying inlet opening 34 is disposed at an angle with respect to the horizontal and is of such an area as to extend entirely across the width and length of pipe 22, if such be desired. This baffle 40 is slidable upon a pair of opposed brackets 42 mounted upon the walls of pipe 22 and formed to underlie baffle 40. One of the brackets 42 is provided with a plurality of spaced apart openings 44 for receiving a pin 46 mounted in the baffle 40 and extending a distance therebelow. Pipe 22 is provided with a transverse slot 48 through which baffle 40 extends to a point beyond the exterior of pipe 22, to provide a grip for the operator when adjustment is necessary. Baffle 40 is illustrated in Fig. 3 as being in a position where the lowermost end thereof is spaced from one wall of pipe 22. This baffle 40 may be moved along brackets 42 to a position where the lowermost end thereof is spaced a desired distance from the wall of pipe 22 having air inlet opening 34 therein. Such adjustment is affected by simply tipping the baffle 40 to move pin 46 out of a perforation 44. It is notable that inlet opening 36 is to one side of baffle 40, whereas the outlet opening 38 is beneath and faces the opposite side thereof. Baffle 40 intersects pipe 22 between openings 36 and 38, as shown in Fig. 3. Each of the outlet openings 38 of the respective sections 24, 26 and 28 of pipe 22 has a conduit 50 in communication therewith at one of its ends and this conduit 50 joins with a suction blower 52 at the opposite end thereof. For convenience in constructing and permitting easy manipulation of the baffles 40 the inlet and outlet openings 36 and 38 respectively of section 26 are disposed at right angles with respect to the inlet and outlet openings 36 and 38 respectively of sections 24 and 28. Material passing into the conduits 50 and thence into their respective blowers 52, pass therefrom to a point of loading, grinding, storage or recirculation through the drum 10 by way of pipes 54.

In operation the treated material which has passed from the dehydrator 10 to the hopper 18 falls by gravity into the vertical pipe 22 through inlet opening 34. This material then falls upon the first underlying baffle 40 of the uppermost section 24 where its progress is retarded and the same is caused to roll downwardly along this baffle 40, suction created within outlet conduit 50 will withdraw the relatively light and fully dehydrated particles from pipe 33. Such material as fails to move outwardly through the uppermost outlet opening 38 continues to fall by gravity upon the next succeeding underlying baffle 40. The same action occurs within sections 26 and 28 and the particles will pass from pipe 22 in accordance with the setting of the baffles 40 as the lowermost conduit 50 is approached. In other words, in the instance illustrated the material will be separated into three different grades as the same progresses through the pipe 22. Those materials moving through the outlet pipe 50 of section 28 will be heavier and, therefore, will usually contain more moisture than the material within the other two conduits 50. Since this difference in the extent of dehydration is generally due to larger particles, such particles passing from section 28 and into the respective blower 52 should be ground into finer granules. Therefore, it is desirable to include a grinder within the blower 52 of this lowermost conduit 50. Whether or not this grinder is provided, of course, is optional and although not shown in the drawings, it is contemplated that these ground particles be recirculated through the rotatable drum 10 for further dehydration. Any suitable conveyor means may be employed for this operation.

The extent of suction created by the respective blowers 52 for the conduits 50 may be varied by adjusting means if such becomes necessary or desirable. Adjustment of the various baffles 40 to change the extent to which the passage through pipe 22 is restricted and the movement of the material thereby retarded within this pipe 22 will obviously govern the amount and character of such particles removed by the respective blowers 52. In other words, a greater or lesser amount of the larger particles may be caused to be moved into the lowermost conduit 50 for grinding and/or further dehydration. The lowermost end of pipe 22 extends downwardly a distance below lowermost section 28 and is open to allow the escape of heavy undesirable particles as foreign matter. Thus undesirable heavy objects, such as nuts, bolts, etc. that may accidentally be present within the material, will fall from conduit 22 and not pass into the finished product or into the above mentioned grinder or one of the blowers 52.

While only one form of separating assembly for use with a dehydrating plant has been illustrated and described, it is understood that many changes and modifications may be made without departing from the spirit of this invention or scope of the appended claims.

Having thus described the invention, what is claimed as new and desired to be secured by Letters Patent is:

1. An assembly for separating dehydrated materials comprising an open bottom, multi-sided, vertical pipe having a materials inlet opening at the uppermost end thereof; an air inlet opening formed in one side of said pipe; an outlet opening formed in a second side of the pipe opposite to said one side, the horizontal axis of the outlet opening being above the horizontal axis of the air inlet opening; a suction tube exteriorly of the pipe in communication with said outlet opening for drawing air through the air inlet opening, into the pipe and thence through the outlet opening whereby to separate relatively light particles from dehydrated materials gravitating through the pipe from the materials inlet opening to said open bottom of the pipe and thereby force said particles through the outlet opening and into said tube; and a flat baffle plate having a horizontal axis and an inclined axis and extending into the pipe through said second side above the outlet opening, said baffle plate projecting downwardly and inwardly from the outlet opening toward said one side of the pipe and being reciprocable within the second wall on its inclined axis toward and away from said one wall for varying the flow of air from the air inlet opening to the outlet opening and thereby varying the flow of said light particles from the pipe to the tube, the lowermost edge of the baffle plate being adjacent the lowermost edge of the air inlet opening when the baffle plate is at the lower end of its reciprocable path of travel.

2. An assembly for separating dehydrated materials comprising an open bottom, vertical pipe having a materials inlet opening at the uppermost end thereof, a pair of opposed side walls and a pair of opposed end walls; a number of superimposed air inlet openings formed in one end wall and in one side wall respectively; a plurality of superimposed outlet openings formed in the other end wall and in the other side wall respectively, each outlet opening corresponding to an air inlet opening and having its horizontal axis above the horizontal axis of the air inlet opening thereof; a suction tube exteriorly of the pipe and communicating with each outlet opening respectively for drawing air into the pipe whereby to separate relatively light particles from materials gravitating through the pipe and force the same into the tubes; and an inclined baffle plate extending into the pipe above each outlet opening respectively and shiftable toward and away from the corresponding air inlet opening, the lowermost edge of each baffle plate being in a vertical plane intersecting a vertical plane through the lowermost edge of the baffle plate next below.

WALLACE L. McGEHEE.

REFERENCES CITED

The following references are of record in the file of this patent:

UNITED STATES PATENTS

| Number | Name | Date |
| --- | --- | --- |
| 746,302 | Dodge | Dec. 8, 1903 |
| 1,085,921 | Lakey | Feb. 3, 1914 |
| 1,418,866 | Dennig | June 6, 1922 |
| 1,442,466 | Carll | Jan. 16, 1923 |
| 1,506,494 | Lindsay | Aug. 26, 1924 |
| 1,530,277 | Mettler | Mar. 17, 1925 |
| 1,755,490 | Seymour | Apr. 22, 1930 |
| 2,384,891 | Collins et al. | Sept. 18, 1945 |